United States Patent
Naser et al.

(10) Patent No.: US 11,436,839 B2
(45) Date of Patent: Sep. 6, 2022

(54) SYSTEMS AND METHODS OF DETECTING MOVING OBSTACLES

(71) Applicants: TOYOTA RESEARCH INSTITUTE, INC., Los Altos, CA (US); MASSACHUSETTS INSTITUE OF TECHNOLOGY, Cambridge, MA (US)

(72) Inventors: Felix Maximilian Naser, Cambridge, MA (US); Igor Gilitschenski, Cambridge, MA (US); Guy Rosman, Newton, MA (US); Alexander Andre Amini, Cambridge, MA (US); Fredo Durand, Somerville, MA (US); Antonio Torralba, Somerville, MA (US); Gregory Wornell, Wellesley, MA (US); William Freeman, Acton, MA (US); Sertac Karaman, Cambridge, MA (US); Daniela Rus, Weston, MA (US)

(73) Assignees: TOYOTA RESEARCH INSTITUTE, INC., Los Altos, CA (US); MASSACHUSETTS INSTITUE OF TECHNOLOGY, Cambridge, ME (US)

( * ) Notice: Subject to any disclaimer, the term of this patent is extended or adjusted under 35 U.S.C. 154(b) by 99 days.

(21) Appl. No.: 16/179,223

(22) Filed: Nov. 2, 2018

(65) Prior Publication Data

US 2020/0143177 A1  May 7, 2020

(51) Int. Cl.
| | |
|---|---|
| *G06K 9/00* | (2022.01) |
| *G06V 20/58* | (2022.01) |
| *G06V 40/10* | (2022.01) |
| *G06T 5/00* | (2006.01) |

(52) U.S. Cl.
CPC ............ *G06V 20/58* (2022.01); *G06V 40/103* (2022.01); *G06T 5/003* (2013.01); *G06T 5/009* (2013.01)

(58) Field of Classification Search
CPC ............ G06K 9/00805; G06K 9/00369; G06T 5/009; G06T 5/003
See application file for complete search history.

(56) References Cited

U.S. PATENT DOCUMENTS

| | | | |
|---|---|---|---|
| 5,592,567 A | 1/1997 | Milger | |
| 5,721,692 A | 2/1998 | Nagaya et al. | |
| 6,236,751 B1 * | 5/2001 | Farrell | G06T 5/009 382/172 |
| 6,349,113 B1 * | 2/2002 | Mech | G06K 9/346 348/699 |

(Continued)

OTHER PUBLICATIONS

Rosin et al., "Image Difference Threshold Strategies and Shadow Detection", ResearchGate, Nov. 1995.

*Primary Examiner* — Minjung Kim
(74) *Attorney, Agent, or Firm* — Seyfarth Shaw LLP

(57) ABSTRACT

The present disclosure provides systems and methods to detect occluded objects using shadow information to anticipate moving obstacles that are occluded behind a corner or other obstacle. The system may perform a dynamic threshold analysis on enhanced images allowing the detection of even weakly visible shadows. The system may classify an image sequence as either "dynamic" or "static", enabling an autonomous vehicle, or other moving platform, to react and respond to a moving, yet occluded object by slowing down or stopping.

19 Claims, 4 Drawing Sheets

(56) References Cited

U.S. PATENT DOCUMENTS

| | | | | |
|---|---|---|---|---|
| 6,999,604 B1* | 2/2006 | Kim | ............... | H04N 19/543 |
| | | | | 375/E7.083 |
| 7,660,439 B1* | 2/2010 | Lu | ............... | G06K 9/00711 |
| | | | | 348/699 |
| 9,892,328 B2 | 2/2018 | Stein et al. | | |
| 9,904,852 B2 | 2/2018 | Divakaran et al. | | |
| 2005/0007454 A1* | 1/2005 | Needham | ......... | G08B 13/19602 |
| | | | | 348/143 |
| 2007/0030946 A1* | 2/2007 | Tsuyuki | ............. | A61B 6/541 |
| | | | | 378/8 |
| 2011/0267456 A1* | 11/2011 | Adermann | ............. | H04N 7/181 |
| | | | | 348/135 |
| 2012/0236164 A1* | 9/2012 | Nakano | ............. | H04N 5/23219 |
| | | | | 348/208.1 |
| 2014/0037147 A1* | 2/2014 | Yoshio | ............. | G06T 7/20 |
| | | | | 382/107 |
| 2015/0145992 A1* | 5/2015 | Traff | ............. | G06T 11/60 |
| | | | | 348/143 |
| 2017/0098132 A1* | 4/2017 | Yokota | ............. | G06K 9/00335 |
| 2018/0012463 A1* | 1/2018 | Chaudhry | ............. | G06T 7/246 |
| 2018/0268246 A1* | 9/2018 | Kondo | ............. | G06K 9/4661 |
| 2018/0357772 A1* | 12/2018 | Takemura | ........... | G06K 9/00805 |
| 2019/0088178 A1* | 3/2019 | Ward | ............. | G06T 5/003 |
| 2020/0050873 A1* | 2/2020 | Ikeda | .................. | G06K 9/6218 |

\* cited by examiner

SYSTEMS AND METHODS OF DETECTING MOVING OBSTACLES

FIELD OF TECHNOLOGY

The present disclosure relates to machine vision and detection of obstacles, more particularly to the detection of moving obstacles in an obstructed view.

BACKGROUND

The introduction and exploration of machine vision, machine learning and autonomous vehicles has led to many advances in the perception for mobile robotics and autonomous vehicles in non-line-of-sight (NLoS) scenarios. Existing systems in this context rely on ultra-wideband (UWB) systems for localization and expands to use WiFi signals for NLoS perception. One possible approach for mobile robotics explicitly seeing around corners uses a drone or other unmanned aerial vehicle (UAV) which can be launched from a car as an additional source of information. Such an approach requires extensive and expensive hardware infrastructure, assumptions about the occluding material, and deployment of drones. Consideration of occlusion for intelligent transportation systems primarily has focused on improved tracking by improving detectors and detection of other vehicles and pedestrians while assuming partial visibility or a merely a temporary occlusion. Explicit modelling of occlusions has also been used for broader scene understanding.

In machine vision and learning systems, processing of shadows focuses on their removal. For mobile robotics, shadow removal is particularly relevant for improving visual localization, because it enables generating a more weather invariant representation of the environment. Computer vision can also be used to recover or construct hidden scenes. Such techniques, which infer data about the hidden scenery, usually rely on time-of-flight cameras. Such systems are prone to interference from other unpredictable lighting sources and therefore mostly rely on carefully controlled environments.

SUMMARY

The present disclosure provides systems and methods to detect occluded objects using shadow information to anticipate moving obstacles that are occluded behind a corner or other obstacle. Aspects of the disclosure may perform a dynamic threshold analysis on enhanced images allowing the detection of shadows weakly visible to the human eye in low signal-to-noise ratio cases ("SNR"). The system may classify an image sequence as either "dynamic" or "static", enabling an autonomous vehicle, or other moving platform, to react and avoid a potential collision by slowing down or stopping.

According to an aspect of the present disclosure, a method for detecting an unseen object by a vehicle is presented. According to the method, a sequence of images may be captured over a period with an image capture device. The sequence may be stored in a cyclic buffer and each image in the cyclic buffer may be registered to a projected image. The projected image may be enhanced and classified based on a scene determination. A control signal may be issued to the vehicle upon classifying the projected image.

According to another aspect of the present disclosure, a system for detecting an unseen object is disclosed. The system may include an image capture device configured to capture a sequence of images of a period and a cyclic buffer configured to receive the sequence of images. An image rectifier may be configured to register each of the images stored in the cyclic buffer into a projected image and an image processer may be configured to enhance the projected image. An image classifier may be configured to classify the projected image as one of a static image or a dynamic image. A vehicle interface in communication with a vehicle control may be configured to transmit a control signal to the vehicle control upon the classification of the projected image as a dynamic image.

According to another aspect of the present disclosure, a non-transitory computer-readable medium having program code recorded thereon for controlling a robotic device is disclosed. The program code may be executed by a processor and include program code to capture a sequence of images over a period with an image capture device and to store the sequence in a cyclic buffer. The program code may register each image on the cyclic buffer to a projected image and enhance the projected image. The program code may classify the projected image based on a scene determination and issue a control signal to the vehicle upon classifying the projected image.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

Aspects of devices, systems, and methods are illustrated in the figures of the accompanying drawings which are meant to be exemplary and non-limiting, in which like references are intended to refer to like or corresponding parts, and in which.

DETAILED DESCRIPTION

The present disclosure generally provides systems and methods of detecting objects outside the line-of-sight from a moving platform or vehicle. According to one aspect, the disclosed systems and methods may perceive moving obstacles even when those obstacles are occluded behind an object or around a corner or other static obstacles, such as parked cars. The detection of unseen moving objects by observing changes in illuminance may provide for a controller or other device on the vehicle to predict, anticipate and take preventative action to avoid potential conflicts and dangerous situations between the trajectories of the occluded object and the vehicle. Aspects of the disclosed system rely on shadow information as a signal and feature, whereas normally shadows are treated as unwanted noise.

Figure 1:
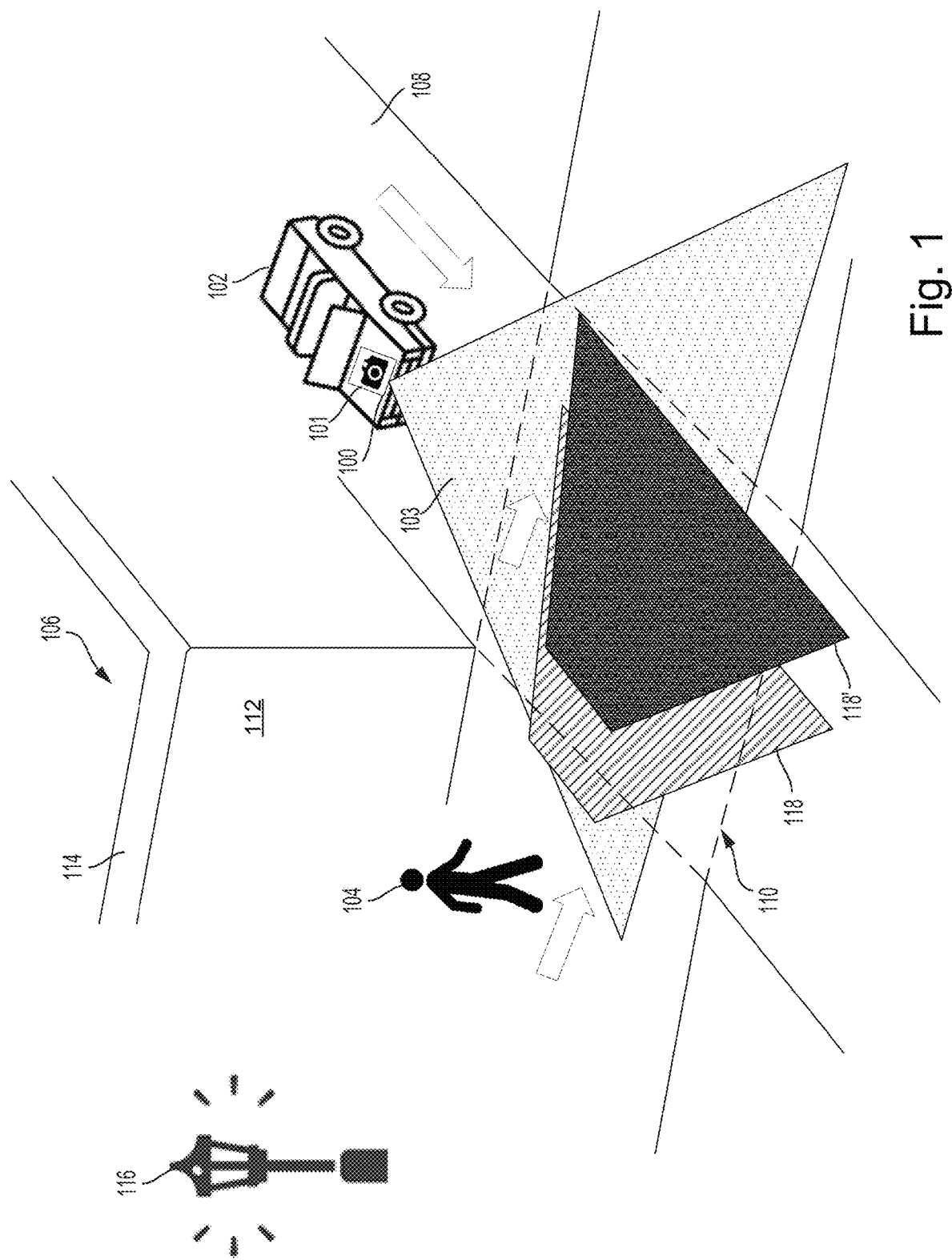
FIG. 1 is a conceptual diagram of an environment in which an object detection system may be implemented according to an aspect of the disclosure.

FIG. 1 depicts an exemplary conceptual environment in which an object detection system 100 may be implemented according to an aspect of the disclosure. A vehicle 102, or other moving platform, may be equipped with an object detection system 100 including an image capture device 101 such as a camera, or other passive sensors such as thermographic or infrared cameras. The vehicle may be an automobile, autonomous vehicle, semi-autonomous vehicle, mobile robotic platform, wheelchair, or the like. The object detection system 100 may be configured to detect the presence of an object, such as a pedestrian 104, around a corner 106, or other obstruction, that blocks or impedes a line-of-sight 103 of the vehicle 102. For example, as a vehicle 102 may be traveling down a roadway 108 towards an intersection 110, a pedestrian 104 may be moving towards the same intersection 110. The pedestrian 104 may be occluded from the vehicle's 102 line-of-sight 103 behind a wall 112 of a building 114, and thus the vehicle 102 may be unaware of the pedestrian 104 moving towards the intersection 110. The object detection system 100, according to one aspect of the present disclosure, may perceive a change in illumination in the intersection and cause the vehicle 102 to respond accordingly. For example, a street light 116, or other environmental illumination source may cast a shadow 118 of the pedestrian 104 into the intersection 110. According to one aspect, a pronounced and observable cue from the change in illumination generated by a moving object, such as the pedestrian 104, may be perceived by the object detection system 100. The change in illumination, depicted in FIG. 1 as the movement of the shadow 118 to a displaced shadow 118', may be used to predict the movement of the pedestrian 104 and its potential intersection with the vehicle 102 if both the vehicle 102 and the pedestrian 104 were to continue on their present trajectories. While the displaced shadow 118' is shown as having moved further into the intersection, one skilled in the art will recognize that the displaced shadow 118' is shown in such a manner to reflect a change in illumination, and not necessarily a lateral movement of the shadow itself.

Inferring motion around corners may be accomplished in either daylight or night time. At night, detection of changes in illumination may be more easily discernable due to the contrast of the light and dark surrounding areas. It becomes considerably more challenging, however, to infer motion during daytime or while operating a vehicle in a well-lit environment as it requires motion detection given a poor signal-to-noise ratio (SNR) due to a sometimes barely visible shadow. In these scenarios, shadows may be enhanced and used as a cue, providing information on whether a potential obstacle behind a corner is present and in motion. According to one aspect of the disclosure, size, speed, direction, number, or other characteristics of an unseen object may be determined.

According to one aspect, the problem of anticipating potential collisions with moving obstacles that are occluded behind a corner 106 may be solved using a dynamic threshold on color-amplified, or otherwise enhanced, images. Doing so may allow the detection of shadows, even those shadows weakly visible to a human eye and affirmative use of the shadow information to assist in controlling the vehicle. The object detection system 100 may obtain and classify an image sequence as either "dynamic" or "static" or give a probability of dynamic movement, enabling the vehicle 102 to react and take appropriate action, such as slowing down or stopping as the vehicle 102 approaches the intersection 110.

Figure 2:
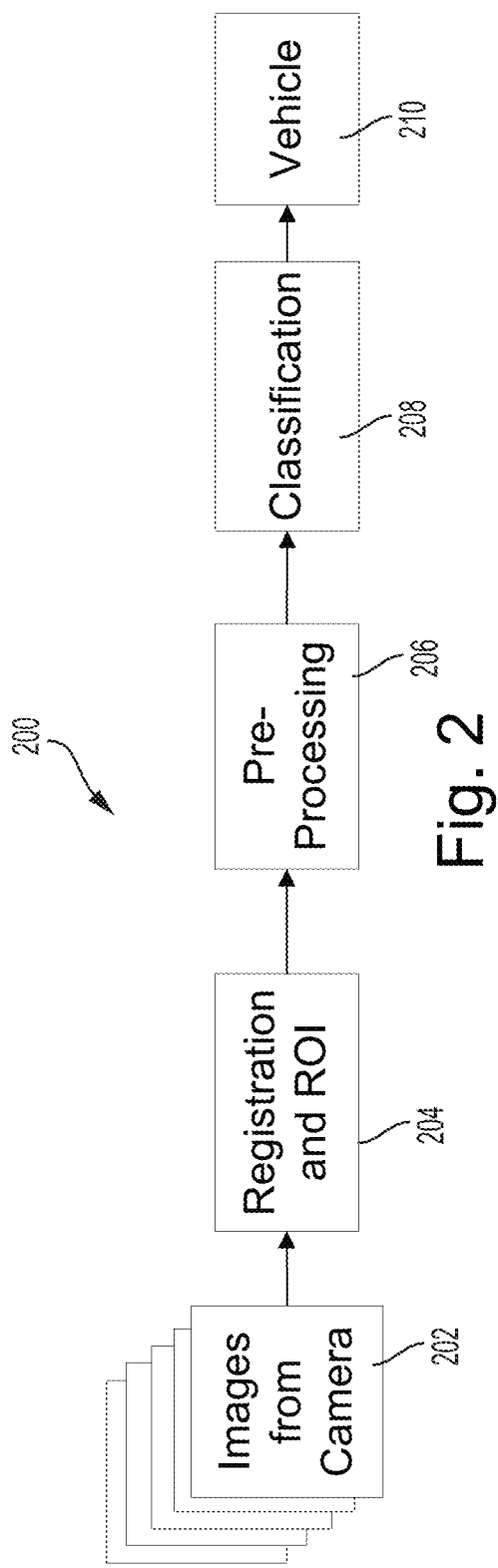
FIG. 2 is a process diagram of an object detection system according to an aspect of the disclosure.

FIG. 2 depicts a process flow 200 of the object detection system 100 according to an aspect of the disclosure. A camera, or other image capture device, may obtain a sequence of images 202 over time as the vehicle travels down a roadway or other trajectory. The images may be collected and input into a cyclic buffer. The system may use a cyclic frame buffer approach to achieve real-time performance. That is, the system may output a detection result whenever a new image fulfills the requirements to get appended to the sequence. The requirements may include appropriately identified markers in the environment and region of interest (ROI) in which the camera is looking, as well as image quality condition. Another approach to identify the ROI may rely on feature tracking, on a neural-net-based approach or on other ego motion estimation techniques, such as visual odometry. As time passes, a new image may be obtained and added to the buffer while the oldest image is cycled out of the buffer.

These images may be processed in an image registration and ROI operation 204, or image rectifier, to combine the image data from each of the images collected in the cyclic buffer. This stabilization step is optional and dependent on the structure of the classifier. The ROI may be discernable by the system based on static markers or features of the environment and roadway, such as sidewalks, lane lines, reflectors or other fixed environmental features by which the system can identify the intersection and location of where important image data may be obtained. Once a new image gets appended to the sequence, a homography, h, may be generated for each frame to be projected to the viewpoint of the first frame in the sequence. In other words the system may apply image registration to all frames i in the current sequence j according to:

$$f_{j,i}(x,y)=f_{j,i}'(h(x),h(y))$$

After the image registration step, the system may crop the projected image according to the identified ROI. To reduce noise, the system may down-sample each cropped and registered image using bilinear interpolation to a 100×100 patch:

$$f_{j,i}=\text{resize}(f_{j,i},(w,h))$$

After registration and identification of the ROI the image data may undergo a pre-processing operation 206 to enhance the image data to more readily identify the changes in illumination. Pre-processing techniques by which the image data may be enhanced may include, without limitation, color amplification, contrast enhancement, linear or non-linear filtering, or the like. According to one aspect, the pre-processing operation may include a dynamic color amplification. The system may determine the mean image of all of the down sampled images according to:

$$\bar{f}_j = \frac{1}{n}\sum_{i=1}^{n} f_{j,i}$$

The mean image may be subtracted from each frame in the current sequence and a Gaussian blur may be applied before the difference to the mean is amplified. For example, the difference images may be computed according to:

$$d_{j,i} = |G((f_{j,i} - \bar{f}_j), k, \sigma)| * \alpha$$

where G is a linear blur filter of size k using isotropic Gaussian kernels with a covariance matrix diag($\sigma^2$, $\sigma^2$). '$\sigma$' may be chosen depending on k according to $\sigma = 0.3 \cdot ((k-1) \cdot 0.5 - 1) + 0.8$. '$\alpha$' may be considered an amplification parameter as it amplifies the difference to the mean image. According to one illustrative aspect, k may be set to 3 and $\alpha$ may be set to 5. This may enhance the image data using color amplification and helps to improve the detectability of a shadow, even if the original signal is invisible to the human eye. This process may increase the SNR ratio. After the frame is color amplified, a temporal low-pass filter may be applied according to:

$$t_{j,i} = d_{j,i} * t + d_{j,i-1} * (1-t)$$

where $t_{j,i}$ is the filtered result of the difference images $d_{j,i}$.

After the image data has undergone the pre-processing operation, the system may analyze the enhanced image data in order to make a classification as to whether the object behind the obstacle, or around the corner, is moving. The system may classify the image data, and the detected object, as static or dynamic. To become more robust against varying sizes and shapes of corners and varying light conditions, a threshold may be applied as to whether the image data is static or dynamic. The difference may be taken from the mean of each channel of the filtered frame as a criterion to determine motion with respect to the standard deviation of the filtered image:

$$c_{i,j} = \begin{cases} 0, & \forall \; |t_{j,i} - \bar{t}_{i,j}| \leq w * \sigma(t_{j,i}) \\ 1, & \forall \; |t_{j,i} - \bar{t}_{i,j}| > w * \sigma(t_{j,i}) \end{cases}$$

where w is a tunable parameter that depends on noise distribution, preferably set to w=2. An underlying assumption may be made that dynamic pixels, i.e., those representing movement, are further away from the mean, since their values change more drastically. A combination of dilation and erosion techniques may be used to first connect pixels which were classified as motion. Erosion may be used to reduce noise. Morphological ellipse elements with two different kernel sizes may be applied according to:

$$c_{j,i} = \text{dilate}(c_{j,i}, 1),$$

$$c_{j,i} = \text{erode}(c_{j,i}, 3)$$

All pixels may then be summed under an intuitive assumption that more movement in between frames will result in a higher sum.

$$s_j = \sum_{i=1}^{n} c_{j,i}(x, y)$$

To classify the whole sequence as either "dynamic" or "static" a camera-specific threshold may be applied. For example, a the threshold percentage of pixels classified as "dynamic" may be set for different camera types, such as a webcam or high-quality DLSR in order to classify the entire scene as dynamic. The noise of the camera may be to be correlated with the choice of the threshold. That is, a less noisy image may result in fewer mis-qualified pixels, which, in turn, results in a lower threshold. Therefore, a better camera, with a high frame rate and resolution, and a better image registration quality may lead to a smaller threshold.

Figure 3B:
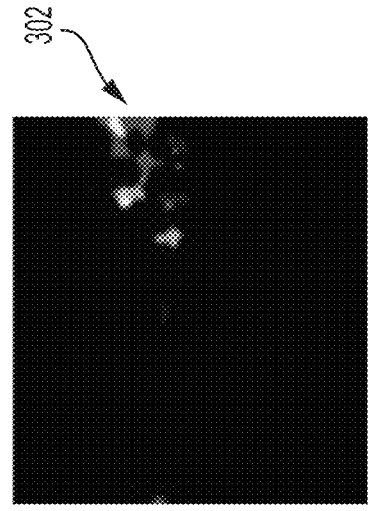
FIGS. 3a-b depict processed image data according to an aspect of the disclosure.
Figure 3A:
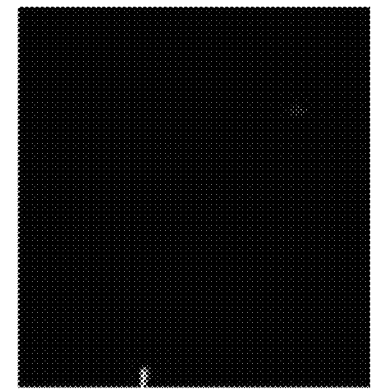

FIGS. 3a-b depict conceptual images of registered and pre-processed image data, according to one aspect of the disclosure. FIG. 3a depicts a representation where no movement is discerned, indicating either a lack of presence of an object, or a stationary object. FIG. 3b, on the other hand, depicts a registered and pre-processed image in which the differentiated pixels 302 of the image map, and their various colors or shades, indicate movement of an object. The sum of the pixel values in the processed image may be compared to a threshold value to determine if the movement is significant enough to classify the image as dynamic.

After a classification of static or dynamic is made, a temporal filter on the detection results may be run to further smooth the signal. Other outlier rejection methods may also be used to produce a smoothed-out signal. This output signal may be used to control the vehicle or for validation purposes. The system may output a control signal or operation to the vehicle to take action based upon the detected object and its movement, if any. If the scene is identified and classified as dynamic, the control signal, in an autonomous or semi-autonomous vehicle, or the like, may include a control operation to slow the vehicle down, stop the vehicle or take other preventative actions.

Figure 4:
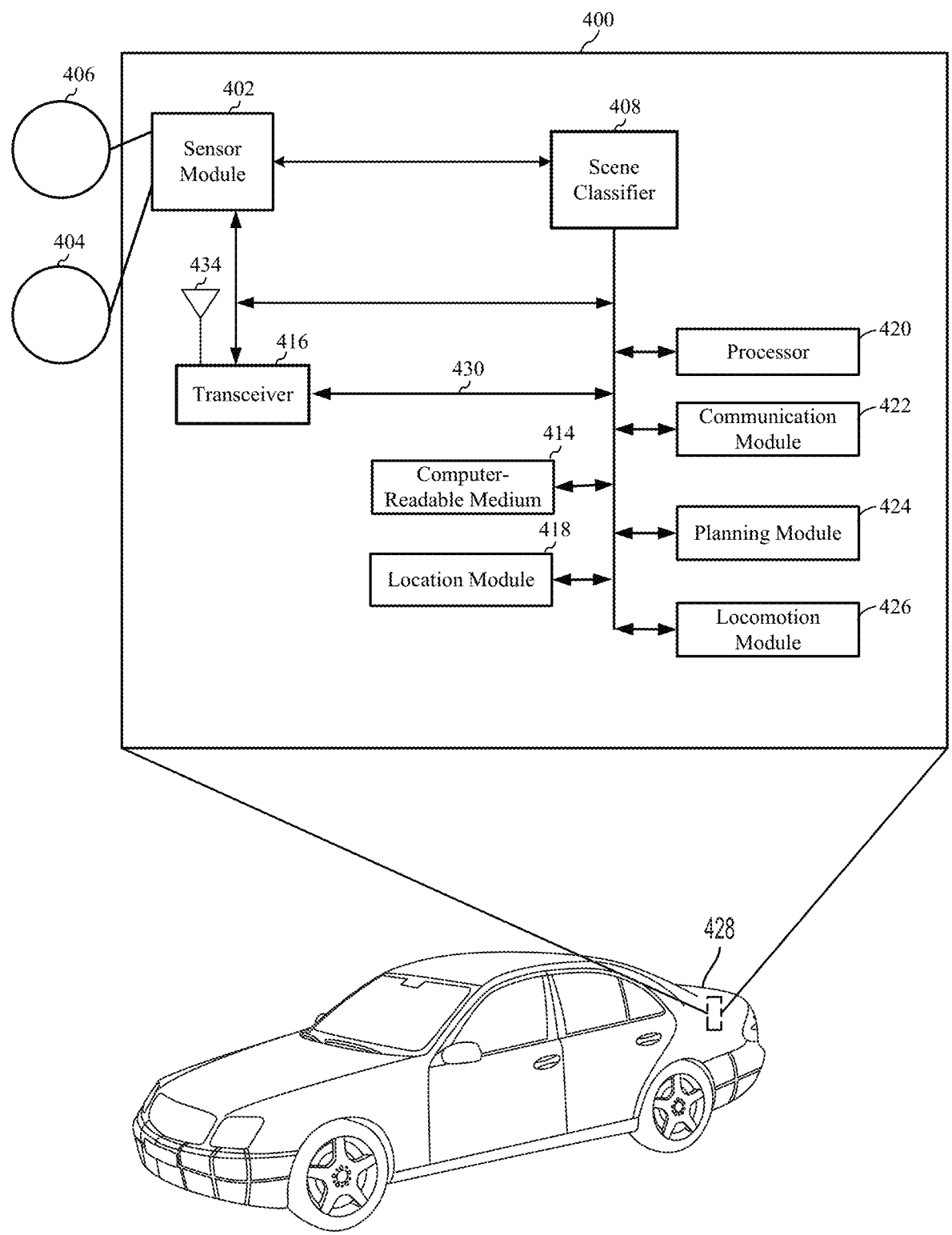
FIG. 4 is a diagram illustrating an example of a hardware implementation for a scene classifier system, according to aspects of the present disclosure.

FIG. 4 is a diagram illustrating an example of a hardware implementation for a scene classification system 400, according to aspects of the present disclosure. The scene classification system 400 may be a component of a vehicle, a robotic device, or other device. For example, as shown in FIG. 4, the scene classification system 400 may be a component of a car 428. Aspects of the present disclosure are not limited to the scene classification system 400 being a component of the car 428, as other devices, such as an ego vehicle, bus, boat, wheelchair, drone, or robot, are also contemplated for using the scene classification system 400. The car 428 may be autonomous or semi-autonomous.

The scene classification system 400 may be implemented with a bus architecture, represented generally by a bus 430. The bus 430 may include any number of interconnecting buses and bridges depending on the specific application of the scene classification system 400 and the overall design constraints. The bus 430 may link together various circuits including one or more processors and/or hardware modules, represented by a processor 420, a communication module 422, a location module 418, a sensor module 402, a locomotion module 426, a planning module 424, and a computer-readable medium 414. The bus 430 may also link various other circuits such as timing sources, peripherals, voltage regulators, and power management circuits, which are well known in the art, and therefore, will not be described any further.

The scene classification system 400 may include a transceiver 416 coupled to the processor 420, the sensor module 402, a scene classifier 408, the communication module 422, the location module 418, the locomotion module 426, the planning module 424, and the computer-readable medium 414. The transceiver 416 is coupled to an antenna 434. The transceiver 416 communicates with various other devices over a transmission medium. For example, the transceiver 416 may receive commands via transmissions from a user or a remote device. As another example, the transceiver 416 may transmit driving statistics and information from the PPS generator 408 to a server (not shown).

The scene classifier system 400 may include the processor 420 coupled to the computer-readable medium 414. The processor 420 may perform processing, including the execution of software stored on the computer-readable medium 414 providing functionality according to the disclosure. The software, when executed by the processor 420, causes the scene classifier system 400 to perform the various functions described for a particular device, such as the car 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406. The measurements of the first sensor 406 and the second sensor 404 may be processed by one or more of the processor 420, the sensor module 402, the scene classifier 408, the communication module 422, the location module 418, the locomotion module 426, the planning module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the car 428 or may be in communication with the car 428.

The location module 418 may be used to determine a location of the car 428. For example, the location module 418 may use a global positioning system (GPS) to determine the location of the car 428. The communication module 422 may be used to facilitate communications via the transceiver 416. For example, the communication module 422 may be configured to provide communication capabilities via different wireless protocols, such as WiFi, long term evolution (LTE), 3G, etc. The communication module 422 may also be used to communicate with other components of the car 428 that are not modules of the scene classifier system 400.

The locomotion module 426 may be used to facilitate locomotion of the car 428. As an example, the locomotion module 426 may control movement of the wheels. As another example, the locomotion module 426 may be in communication with a power source of the car 428, such as an engine or batteries. Of course, aspects of the present disclosure are not limited to providing locomotion via wheels and are contemplated for other types of components for providing locomotion, such as propellers, treads, fins, and/or jet engines.

The scene classifier system 400 may also include the planning module 424 for planning a route or controlling the locomotion of the car 428, via the locomotion module 426, based on the analysis performed by the scene classifier 408. In one configuration, the planning module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The scene classifier 408 may be in communication with the sensor module 402, the transceiver 416, the processor 420, the communication module 422, the location module 418, the locomotion module 426, the planning module 424, and the computer-readable medium 414. In one configuration, the scene classifier may receive sensor data from the sensor module 402. The sensor module 402 may receive the sensor data from the first sensor 406 and the second sensor 404. According to aspects of the disclosure, the sensor module 402 may filter the data to remove noise, encode the data, decode the data, merge the data, extract frames, or perform other functions. In an alternate configuration, the scene classifier 408 may receive sensor data directly from the first sensor 406 and the second sensor 404.

As shown in FIG. 4, the scene classifier 408 may be used to classify an environmental scene as detailed herein. For example, the scene classifier 408 may detect an unseen object around a corner or behind an obstacle. The scene classifier 408 may receive information from one of the sensors 404, 406, such as a series of images for input into a cyclic buffer. Those images may be processed, enhanced and registered, as described herein, and the scene classifier may classify the environment based on any perceived motion or change in illumination of the images in the cyclic buffer. The scene classifier may determine the environment as static or dynamic, or may assign a probability of dynamic movement based upon the image processed image information.

The scene classifier 408 may output the classification to one or more of the sensor modules 402, the transceiver 416, the processor 420, the communication module 422, the location module 418, the locomotion module 426, the planning module 424, and the computer-readable medium 414. The classification output may be used to control the car 428 in response to the classification. For example, the if the scene is classified as dynamic, or has a high probability of being dynamic, signals may be transmitted to the communication module 422, the location module 418, the locomotion module 426, the planning module 424, and the computer-readable medium 414 such that the car 428 may take corrective action, such as slowing down or stopping. In such a manner the scene classifier 408 may use shadow information as a signal, instead of noise, to generate or perceive affirmative and useful information in the scene for the purpose of controlling the car 428.

Figure 5:
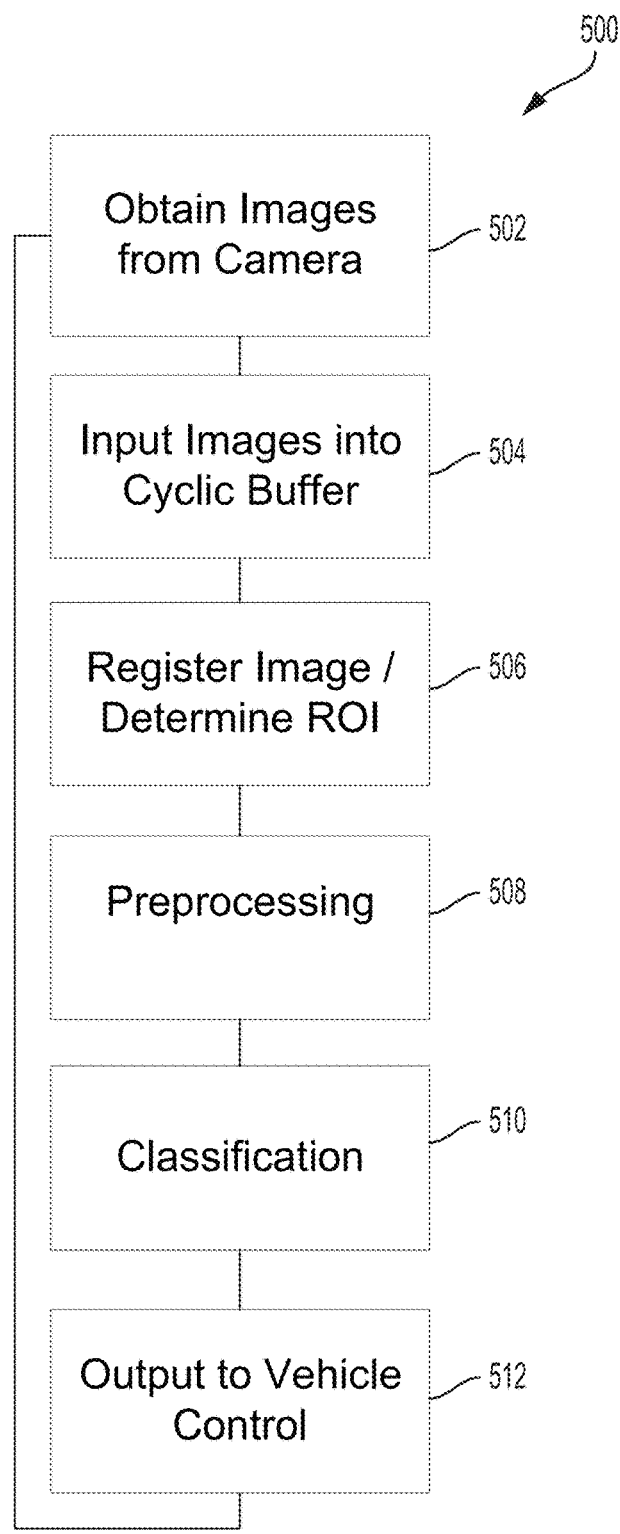
FIG. 5 is a flow diagram of a method of detecting an object according to an aspect of the disclosure.

FIG. 5 depicts a flow diagram 500 of an scene classification method, implemented in an autonomous or semi-autonomous vehicle, according to one aspect of the present disclosure. According to aspects of the present disclosure, and described herein, a scene classification method may begin, as shown in block 502, by obtaining a sequence of images from a camera, such as an RGB camera. As shown in block 504, the images obtained may be input into a cyclic buffer where they may undergo a registration and ROI determination process, as shown in block 506. The sequence of images may be registered in to a single projected image in which one or more ROIs may be determined from the projected image data.

As shown in block 508, the projected image may under preprocessing to enhance the image data to more readily determine changes in illumination. The projected image may be enhanced using any number of image processing techniques, including but not limited to, color amplification, contrast enhancement, linear or non-linear filtering, or the like. As shown in block 510, after the image data has undergone pre-processing enhancement, the method 500 may analyze the enhanced image data in order to make a classification as to whether a moving, unseen object is perceived.

As described herein, substantial changes in illumination, and more specifically, the pixel values of the sequence of images and the combined projected image, may form a perception of movement of an object around a corner or behind an obstruction. The system may classify the image data and consequently the scene and the detected object, as static or dynamic. As shown in block 512, if the method 500 makes a determination of a dynamic scene, a signal may be transmitted to a communications or control system which may then take appropriate action, such as alerting an operator or a passenger, or causing the vehicle to stop or slow down.

The method 500 may be run cyclically or periodically according to a chosen frequency of image captures. Once a classification is made, or a given period of time has passed, a new image may be obtained by the camera and cycled into the buffer, replacing or pushing the oldest image out. The updated sequence of images may then undergo the process as detailed above, providing an updated scene classification as the vehicle travels through the environment.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for detecting an unseen object by a vehicle comprising:
   capturing a sequence of images over a period with an image capture device;
   storing the sequence in a cyclic buffer;
   registering each image on the cyclic buffer to a projected image;
   enhancing the projected image;
   identifying a shadow of a non-line-of-sight object in the projected image;
   comparing a sum of pixel values in the projected image to a threshold value to determine movement of the shadow;
   classifying into a scene determination the projected image based on the movement of the shadow; and
   issuing a control signal to the vehicle upon classifying the projected image.

2. The method of claim 1 wherein classifying the projected image comprises classifying the image as a dynamic scene.

3. The method of claim 1 wherein classifying the projected image comprises determining a probability of the scene as one of a static scene or a dynamic scene.

4. The method of claim 1 wherein the step of enhancing the projected image comprises color amplification.

5. The method of claim 1 wherein the step of enhancing the projected image further comprises resizing the projected image.

6. The method of claim 1 wherein the step of enhancing the projected image further comprises down-sampling the projected image.

7. The method of claim 1 wherein the step of enhancing the projected image further comprises computing a mean image.

8. The method of claim 7 wherein the step of enhancing the projected image further comprises subtracting the mean image from each image in the sequence.

9. The method of claim 1 wherein the step of enhancing the projected image further comprises applying a Gaussian blur.

10. The method of claim 1 further comprising determining a region of interest from the projected image.

11. The method of claim 1 further comprising applying a temporal low-pass filter on the enhanced projected image.

12. The method of claim 1 wherein the control signal comprises a command to halt a trajectory of the vehicle.

13. The method of claim 1 wherein the pixel values of the projected image are indicative of a change in illumination in the sequence of images.

14. The method of claim 1 wherein the classification of the projected image comprises determining a speed of an unseen object.

15. The method of claim 1 wherein the classification of the projected image comprises determining a direction of an unseen object.

16. The method of claim 1 wherein the classification of the projected image comprises determining a quantity of unseen objects.

17. The method of claim 1 wherein the classification of the projected image comprises determining a size of an unseen object.

18. A system for detecting an unseen object comprising:
an image capture device configured to capture a sequence of images of a period;
a cyclic buffer configured to receive the sequence of images;
a processor configured to:
   register each of the images stored in the cyclic buffer into a projected image;
   enhance the projected image;
   identify a shadow of a non-line-of-sight object in the projected image; and
   compare a sum of pixel values in the projected image to a threshold value to determine movement of the shadow;
   classify the projected image as one of a static image or a dynamic image based on the movement of the shadow; and
a vehicle interface in communication with a vehicle control, the vehicle interface configured to transmit a control signal to the vehicle control upon the classification of the projected image as a dynamic image.

19. A non-transitory computer-readable medium having program code recorded thereon for controlling a robotic device, the program code executed by a processor and comprising:
   program code to capture a sequence of images over a period with an image capture device;
   program code to store the sequence in a cyclic buffer;
   program code to register each image on the cyclic buffer to a projected image;
   program code to enhance the projected image;
   program code to identify a shadow of a non-line-of-sight object in the projected image;
   program code to compare a sum of pixel values in the projected image to a threshold value to determine movement of the shadow;
   program code to classify into a scene determination the projected image based on the movement of the shadow; and
   program code to issue a control signal to the vehicle upon classifying the projected image.

* * * * *